United States Patent
King

(10) Patent No.: US 10,760,619 B2
(45) Date of Patent: Sep. 1, 2020

(54) SHAFT SHEAR SECTION

(71) Applicant: Goodrich Corporation, Charlotte, NC (US)

(72) Inventor: Michael King, Sauquoit, NY (US)

(73) Assignee: Goodrich Corporation, Charlotte, NC (US)

(*) Notice: Subject to any disclaimer, the term of this patent is extended or adjusted under 35 U.S.C. 154(b) by 325 days.

(21) Appl. No.: 15/905,196

(22) Filed: Feb. 26, 2018

(65) Prior Publication Data

US 2019/0264752 A1 Aug. 29, 2019

(51) Int. Cl.
*F16D 9/06* (2006.01)
*F16D 1/033* (2006.01)

(52) U.S. Cl.
CPC ............. *F16D 9/06* (2013.01); *F16D 1/033* (2013.01)

(58) Field of Classification Search
CPC .................................. F16D 9/06; F16D 1/033
USPC ........................................................ 464/33
See application file for complete search history.

(56) References Cited

U.S. PATENT DOCUMENTS

| | | | | |
|---|---|---|---|---|
| 1,439,380 A | * | 12/1922 | Ryding | ............... F16D 9/06 464/33 |
| 3,237,741 A | | 3/1966 | Potter et al. | |
| 3,973,412 A | * | 8/1976 | Miles | ............... F16D 9/06 464/33 |
| 6,764,404 B1 | * | 7/2004 | Gullickson | ............... F16D 9/06 464/33 |
| 2004/0097293 A1 | | 5/2004 | Poster | |
| 2012/0064981 A1 | | 3/2012 | Copeland | |

FOREIGN PATENT DOCUMENTS

| | | |
|---|---|---|
| GB | 2384160 A | 7/2003 |
| WO | WO00/26554 A1 | 5/2000 |
| WO | WO2017/160640 A1 | 9/2017 |

OTHER PUBLICATIONS

Extended European Search Report for EP Application No. 19156217.2, dated May 27, 2019, 7 pages.

* cited by examiner

Primary Examiner — Greg Binda
(74) Attorney, Agent, or Firm — Kinney & Lange, P.A.

(57) ABSTRACT

A shear section for a rotating arrangement includes an axially-extending shaft having a connection flange and a coupling flange adjacent the connection flange. The coupling flange includes an annular shoulder portion and an elongated neck portion extending axially away from the shoulder portion and disposed concentrically within the shaft. The shear section further includes a plurality of fasteners extending axially through the shoulder portion and the connection flange, and securing the shaft to the coupling flange. Each of the plurality of fasteners includes a shank region and a reduced thickness portion circumscribing the shank region.

15 Claims, 2 Drawing Sheets

SHAFT SHEAR SECTION

BACKGROUND

Power transmission shafts are used to transmit rotational power between an engine and a gearbox, or between gearboxes. Because transmission shafts are typically less costly than the components to which they are attached, they are sometimes designed to be the point of failure during torsional overloads. Current technology directed to controlling the point of failure includes an area of reduced thickness, or "necked-down region," at the desired point of failure. A containment device can also be circumferentially disposed around the shaft to contain a broken, flailing section in the event of a failure, thus protecting nearby components. Containment devices, however, are often designed for non-torsional load failures, and may therefore be located at a shaft region away from the necked-down region. Thus, a flailing shaft caused by a torsional overload might not be properly contained using the existing technology.

SUMMARY

A shear section for a rotating arrangement includes an axially-extending shaft having a connection flange and a coupling flange adjacent the connection flange. The coupling flange includes an annular shoulder portion and an elongated neck portion extending axially away from the shoulder portion and disposed concentrically within the shaft. The shear section further includes a plurality of fasteners extending axially through the shoulder portion and the connection flange, and securing the shaft to the coupling flange. Each of the plurality of fasteners includes a shank region and a reduced thickness portion circumscribing the shank region.

A shaft assembly for connecting a drive device to a driven device includes an axially-extending shaft configured to attach to the driven device at a first end, the shaft further including a second end opposite the first end, and a shear section located at the second end. The shear section includes an annular connection flange and a coupling flange adjacent the connection flange. The coupling flange includes an annular shoulder portion and an elongated neck portion extending axially away from the shoulder portion and disposed concentrically within the shaft. The coupling flange is further configured to attach to the drive device. The shear section further includes a plurality of fasteners extending axially through the shoulder portion and the connection flange, and securing the shaft to the connection flange. Each of the plurality of fasteners includes a shank region and a reduced thickness portion circumscribing the shank region.

A method of servicing a shear section of a rotating arrangement includes replacing a plurality of existing fasteners with a plurality of replacement fasteners, such that the plurality of replacement fasteners secures a shaft to a coupling flange of the shear section. Each of the plurality of replacement fasteners includes a shank region and a reduced thickness portion circumscribing the shank region.

DETAILED DESCRIPTION

The present invention is directed to a shear section for a rotating shaft. The shear section is located at the drive end of the shaft, and includes a coupling flange attached to the shaft by a number of shear bolts. Each bolt includes a necked-down region, such that the section is designed to shear (disconnect) at the attachment point of the flange to the shaft. The shear section further includes an anti-flail feature proximate the attachment point such that when the shaft becomes disconnected from the coupling flange, the shaft's radial displacement is mostly contained to prevent damage to surrounding components.

Figure 1:
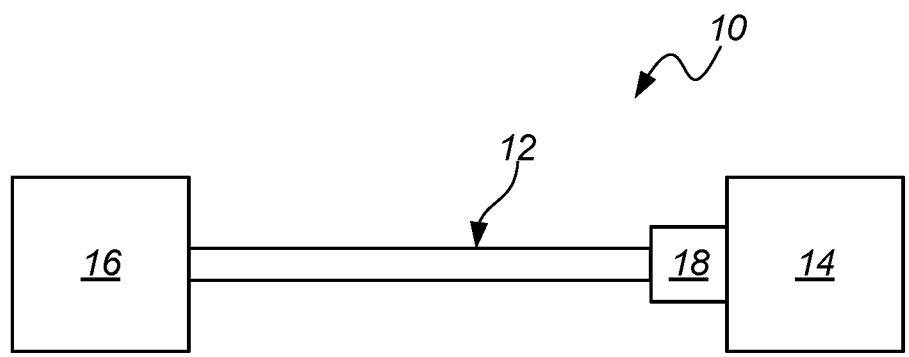
FIG. 1 is a simplified illustration of a shaft assembly including a shear section.

FIG. 1 is a simplified illustration showing shaft assembly 10. Assembly 10 includes shaft 12, drive device 14, and driven device 16. Drive device 14 can be an engine, transmission, or a gearbox designed to transmit torque to shaft 12. Driven device can be a gearbox or other component that receives the torque transmitted by shaft 12. Shaft 12 can be solid, or a fully or partially hollow structure. Shaft 12 includes shear section 18, which, in the embodiment shown, is located adjacent drive device 14.

Figure 2:
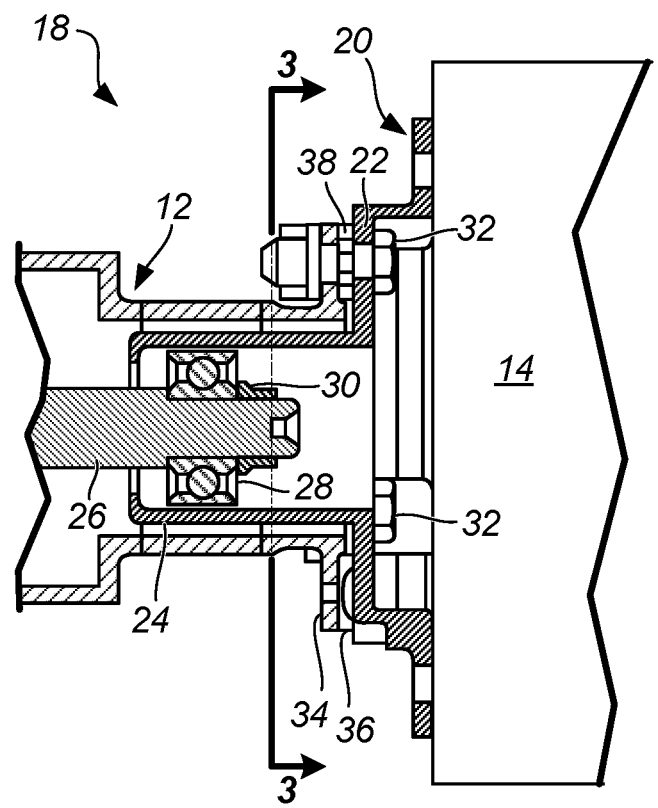
FIG. 2 is a cross-sectional side view of the shear section.
Figure 3:
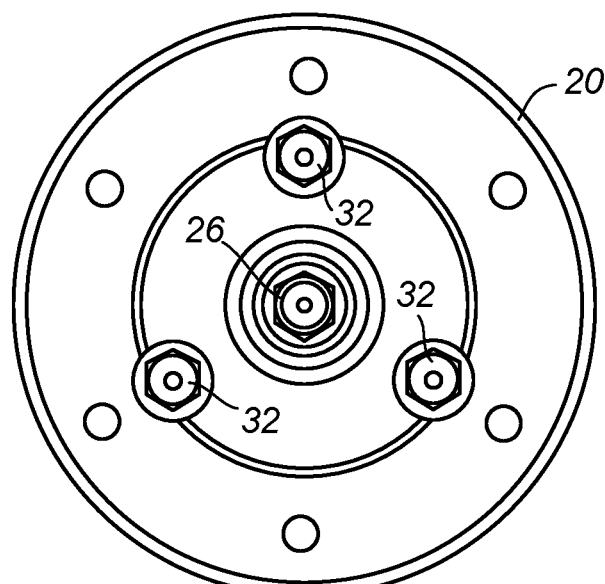
FIG. 3 is a cross-sectional front view of the shear section shown in FIG. 2.

FIGS. 2 and 3 are cross-sectional side and front views, respectively, of shear section 18. Shear section 18 includes a region of shaft 12 attached to annular coupling flange 20. Coupling flange 20 attaches to drive device 14, shown schematically in FIG. 2, on a side opposite shaft 12, either directly or through additional intervening components. Coupling flange 20 includes shoulder portion 22 and neck portion 24 extending axially away from shoulder portion 22. Shoulder portion 22 includes an annular, flat surface through which fasteners can be extended to join coupling flange 20 to shaft 12, as is described in greater detail below. As shown in FIG. 2, neck portion 24 is an elongated annular structure situated concentrically within shaft 12. When coupling flange 20 and shaft 12 are connected, a relatively close tolerance fit exists between shaft 12 and the radially inward neck portion 24. Shear section 18 further includes stud 26 integral to or otherwise fixedly attached to shaft 12. A portion of stud 26 extends into neck portion 24 such that stud 26 is concentric with neck portion 24. Anti-flail bearing 28 is disposed over stud 26 and is retained over stud 26 by anti-flail nut 30. Anti-flail bearing 28 can be, in an exemplary embodiment, a roller bearing, but in other embodiments, can be configured as a plain bearing or a bushing, to name a few, non-limiting examples.

Shaft 12 and coupling flange 20 can be formed from a metal alloy, such as steel or titanium. Other suitable metallic materials are contemplated herein. Shaft 12 and coupling flange 20 can, but do not have to be formed from the same material. Shaft 12 and/or coupling flange 20 can further be manufactured using a machining process, such as milling or turning, to create the various features of shear section 18 and shaft assembly 10.

Shaft 12 can be attached to coupling flange 20 using a plurality of shear bolts 32. Bolts 32 (only one of which is fully shown in FIG. 2) extend axially through shoulder portion 22 and flanged connection region 34 of shaft 12. As can be seen in FIG. 3, bolts 32 are disposed symmetrically around coupling flange 20. When connected, a slight gap 36 remains between shoulder portion 22 and flanged connection region 34, which can accommodate wear ring 38. As is described in greater detail below, wear ring 38 can be separable ring or a coating, depending on the embodiment.

Although FIG. 3 shows three bolts 32, other embodiments can include two, or more than three symmetrically arranged bolts 32. Further, other suitable fasteners aside from bolts (e.g., screws, studs, etc.) can be used to attach shaft 12 and coupling flange 20 in alternative embodiments.

Figure 4:
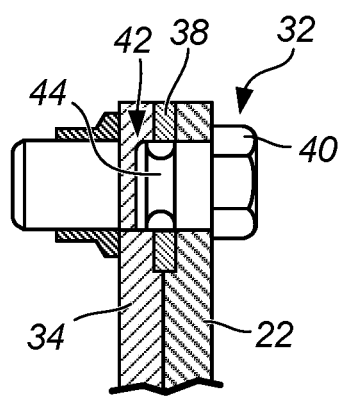
FIG. 4 is an enlarged view of a shear bolt from the shear section of FIGS. 2 and 3.

FIG. 4 is an enlarged cross-sectional view of a bolt 32, shown for simplicity without many of the components of shear section 18. As can be seen in FIG. 4, bolt 32 includes head 40 and shank 42. Shank 42 includes necked-down region 44, designed to be the "weak point" or point of torsional failure for shear section 18 of shaft assembly 10. Each bolt 32 within shear section 18 includes an identical necked-down region 44. In the embodiment shown, bolts 32 form a joint in single shear (at necked-down region 44) between shoulder portion 22 and flanged connection region 34. Bolts 32 can be formed from a metallic material, and can be threaded using a rolling or cutting process. Necked-down region can be formed in shank 42 using a grinding process followed by one or more rounds of polishing. Other machining processes are contemplated herein.

The predetermined torque threshold level of bolts 32 can be selected based upon the overload limits of the other components of shaft assembly 12. As it is desirable for bolts 32 to be the point of failure during torsional overload, necked-down region 44 is designed to have the lowest threshold level in the system, while still being able to continuously transmit normal torque loads through shaft assembly 10. Because the shear stress ($\tau$) is influenced by the cross-sectional area of bolts 32 (represented by the relationship $\tau=F/A$), the threshold level can be modified by, for example, varying the area of necked-down region 44 of each bolt 32 in a particular embodiment, by varying the number of bolts 32 used, or both.

In operation, drive device 14 can be rotationally connected to shear section 18 via coupling flange 20. Coupling flange 20 is rotationally connected to shaft 12 with bolts 32. In the event of a torsional overload—a torque level exceeding the predetermined threshold level of necked-down region 44—bolts 32 are designed to simultaneously shear. In such a case, shaft 12 disconnects from coupling flange 20 such that the two are no longer rotationally connected, which helps reduce or prevent damage to drive device 14 and/or driven device 16. The disconnection of shaft 12 from coupling flange 20 can cause a flailing event in which the unsupported (broken) end of shaft 12 experiences a radial displacement that can damage nearby components. This displacement can be controlled by anti-flail bearing 28, secured to shaft 12 via stud 26, along with neck portion 24 of coupling flange 20. Even after the disconnection of shaft 12 from coupling flange 20, neck portion 24 surrounds and radially contains anti-flail bearing 28, thus preventing substantial radial displacement of shaft 12.

Wear ring 38 can also help prevent secondary damage to the components within or near shaft assembly 10 after an overload event. Although shaft 12 can radially disconnect from coupling flange 20 during an overload event, the two may still remain in close enough proximity to rub together while drive device 14 and coupling flange 20 continue to rotate. This can cause damage to shaft 12 and/or coupling flange 20, as well as create sparks or other debris from the metal-on-metal contact. Wear ring 38, formed from low friction coefficient material (relative to the components of shaft assembly 10), is disposed between coupling flange 20 and shaft 12 to prevent frictional damage. More specifically, wear ring 28 can occupy some or all of gap 36 between should portion 22 and flanged connection region 34, and can further surround necked-down region 44 of each bolt 32. In the embodiment shown, wear ring 38 is an annular ring mechanically attached to flanged connection region 34. In another embodiment, wear ring 38 can instead be attached to shoulder portion 22, or can be held in place by interference fit. In yet another embodiment, wear ring 38 can alternatively be a coating applied to flanged connection region 34 and/or shoulder portion 22. Suitable materials from wear ring 38 include copper alloys like brass and bronze, but generally any low-friction material can be used. Material selection can be based upon, for example, the materials used to form shaft 12 and coupling flange 20.

The collocation of a shear joint and an anti-flail feature within the same shaft region provides robust overload protection to shaft assembly 10 and surrounding components. During a torsional overload event, shear section 18 allows shaft 12 to swiftly and rotationally disconnect from coupling flange 20 to prevent damage to drive device 14. Anti-flail bearing 28 and neck portion 24 inhibit radial displacement of the disconnected end of shaft 12 to prevent damage to other components. Shear section 18 can be modified for use in various types of shaft assemblies by varying the total area of bolts 32. Potential applications of shear section 18 include drive/transmission assemblies in aerospace (rotorcraft and fixed wing aircraft), automotive, marine, and other transportation industries, and generally for any rotatable assembly requiring protection from torsional overload events.

Discussion of Possible Embodiments

The following are non-exclusive descriptions of possible embodiments of the present invention.

A shear section for a rotating arrangement includes an axially-extending shaft having a connection flange and a coupling flange adjacent the connection flange. The coupling flange includes an annular shoulder portion and an elongated neck portion extending axially away from the shoulder portion and disposed concentrically within the shaft. The shear section further includes a plurality of fasteners extending axially through the shoulder portion and the connection flange, and securing the shaft to the coupling flange. Each of the plurality of fasteners includes a shank region and a reduced thickness portion circumscribing the shank region.

The shear section of the preceding paragraph can optionally include, additionally and/or alternatively, any one or more of the following features, configurations and/or additional components:

The above shear section can further include a stud secured to the shaft and disposed concentrically with and radially inside the elongated neck portion.

Any of the above shear sections can further include a bearing and a retaining nut surrounding a portion of the stud within the elongated neck portion.

In any of the above shear sections, the wherein the elongated neck portion and the bearing comprise an anti-flail feature form an anti-flail feature.

Any of the above shear sections can further include a gap between the shoulder portion and the connection flange.

Any of the above shear sections can further include a wear ring disposed within the gap.

In any of the above shear sections, the wear ring can further surround the reduced thickness portions of each of the plurality of fasteners.

In any of the above shear sections, the wear ring can be formed from a low-friction material.

In any of the above shear sections, the shaft and the coupling flange can be formed from a metallic material.

In any of the above shear sections, the plurality of fasteners can be symmetrically disposed around the shoulder portion.

A shaft assembly for connecting a drive device to a driven device includes an axially-extending shaft configured to attach to the driven device at a first end, the shaft further including a second end opposite the first end, and a shear section located at the second end. The shear section includes an annular connection flange and a coupling flange adjacent the connection flange. The coupling flange includes an annular shoulder portion and an elongated neck portion extending axially away from the shoulder portion and disposed concentrically within the shaft. The coupling flange is further configured to attach to the drive device. The shear section further includes a plurality of fasteners extending axially through the shoulder portion and the connection flange, and securing the shaft to the connection flange. Each of the plurality of fasteners includes a shank region and a reduced thickness portion circumscribing the shank region.

The shaft assembly of the preceding paragraph can optionally include, additionally and/or alternatively, any one or more of the following features, configurations and/or additional components:

The above shaft assembly can further include a stud secured to the shaft and disposed concentrically with and radially inside the elongated neck portion.

Any of the above shaft assemblies can further include a bearing and a retaining nut surrounding a portion of the stud within the elongated neck portion.

In any of the above shaft assemblies, the wherein the elongated neck portion and the bearing comprise an anti-flail feature form an anti-flail feature.

Any of the above shaft assemblies can further include a gap between the shoulder portion and the connection flange.

Any of the above shaft assemblies can further include a wear ring disposed within the gap.

In any of the above shaft assemblies, the wear ring can further surround the reduced thickness portions of each of the plurality of fasteners.

In any of the above shaft assemblies, the wear ring can be formed from a low-friction material.

In any of the above shaft assemblies, the shaft and the coupling flange can be formed from a metallic material.

A method of servicing a shear section of a rotating arrangement includes replacing a plurality of existing fasteners with a plurality of replacement fasteners, such that the plurality of replacement fasteners secures a shaft to a coupling flange of the shear section. Each of the plurality of replacement fasteners includes a shank region and a reduced thickness portion circumscribing the shank region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A shear section for a rotating arrangement, the shear section comprising:
   an axially-extending shaft having a connection flange;
   a coupling flange adjacent the connection flange, the coupling flange comprising:
      an annular shoulder portion; and
      an elongated neck portion extending axially away from the shoulder portion and disposed concentrically within the shaft;
   a gap between the annular shoulder portion and the connection flange;
   a wear ring disposed within the gap; and
   a plurality of fasteners extending axially through the shoulder portion and the connection flange, and securing the shaft to the coupling flange;
   wherein each of the plurality of fasteners comprises a shank region and a reduced thickness portion circumscribing the shank region.

2. The shear section of claim 1 and further comprising: a stud secured to the shaft and disposed concentrically with and radially inside the elongated neck portion.

3. The shear section of claim 2 and further comprising: a bearing and a retaining nut surrounding a portion of the stud within the elongated neck portion.

4. The shear section of claim 3, wherein the elongated neck portion and the bearing comprise an anti-flail feature.

5. The shear section of claim 1, wherein the wear ring further surrounds the reduced thickness portions of each of the plurality of fasteners.

6. The shear section of claim 1, wherein the wear ring is formed from a low-friction material.

7. The shear section of claim 1, wherein the shaft and the coupling flange are formed from a metallic material.

8. The shear section of claim 1, wherein the plurality of fasteners is symmetrically disposed around the shoulder portion.

9. A shaft assembly for connecting a drive device to a driven device, the shaft assembly comprising:
   an axially-extending shaft configured to attach to the driven device at a first end, the shaft further comprising a second end opposite the first end;
   a shear section located at the second end, the shear section comprising:
      an annular connection flange;
      a coupling flange adjacent the connection flange, the coupling flange comprising:
         an annular shoulder portion; and
         an elongated neck portion extending axially away from the shoulder portion and disposed concentrically within the shaft;
         wherein the coupling flange is further configured to attach to the drive device;
      a gap between the annular shoulder portion and the connection flange;
      a wear ring disposed within the gap; and
      a plurality of fasteners extending axially through the shoulder portion and the connection flange, and securing the shaft to the connection flange;
      wherein each of the plurality of fasteners comprises shank region and a reduced thickness portion circumscribing the shank region.

10. The shaft assembly of claim 9 and further comprising: a stud secured to the shaft and disposed concentrically with and radially inside the elongated neck portion.

11. The shaft assembly of claim 10 and further comprising: a bearing and a retaining nut surrounding a portion of the stud within the elongated neck portion.

12. The shaft assembly of claim 11, wherein the elongated neck portion and the bearing comprise an anti-flail feature.

13. The shaft assembly of claim 9, wherein the wear ring further surrounds the reduced thickness portions of each of the plurality of fasteners.

14. The shaft assembly of claim 9, wherein the wear ring is formed from a low-friction material.

15. The shaft assembly of claim 9, wherein the shaft and the coupling flange are formed from a metallic material.

\* \* \* \* \*